No. 727,664. PATENTED MAY 12, 1903.
R. MILNE.
MACHINE FOR COVERING ROLLERS WITH INDIA RUBBER
OR LIKE MATERIALS.
APPLICATION FILED JAN. 27, 1902.
NO MODEL. 2 SHEETS—SHEET 1.

Inventor:
Robert Milne.

No. 727,664. PATENTED MAY 12, 1903.
R. MILNE.
MACHINE FOR COVERING ROLLERS WITH INDIA RUBBER
OR LIKE MATERIALS.
APPLICATION FILED JAN. 27, 1902.
NO MODEL. 2 SHEETS—SHEET 2.
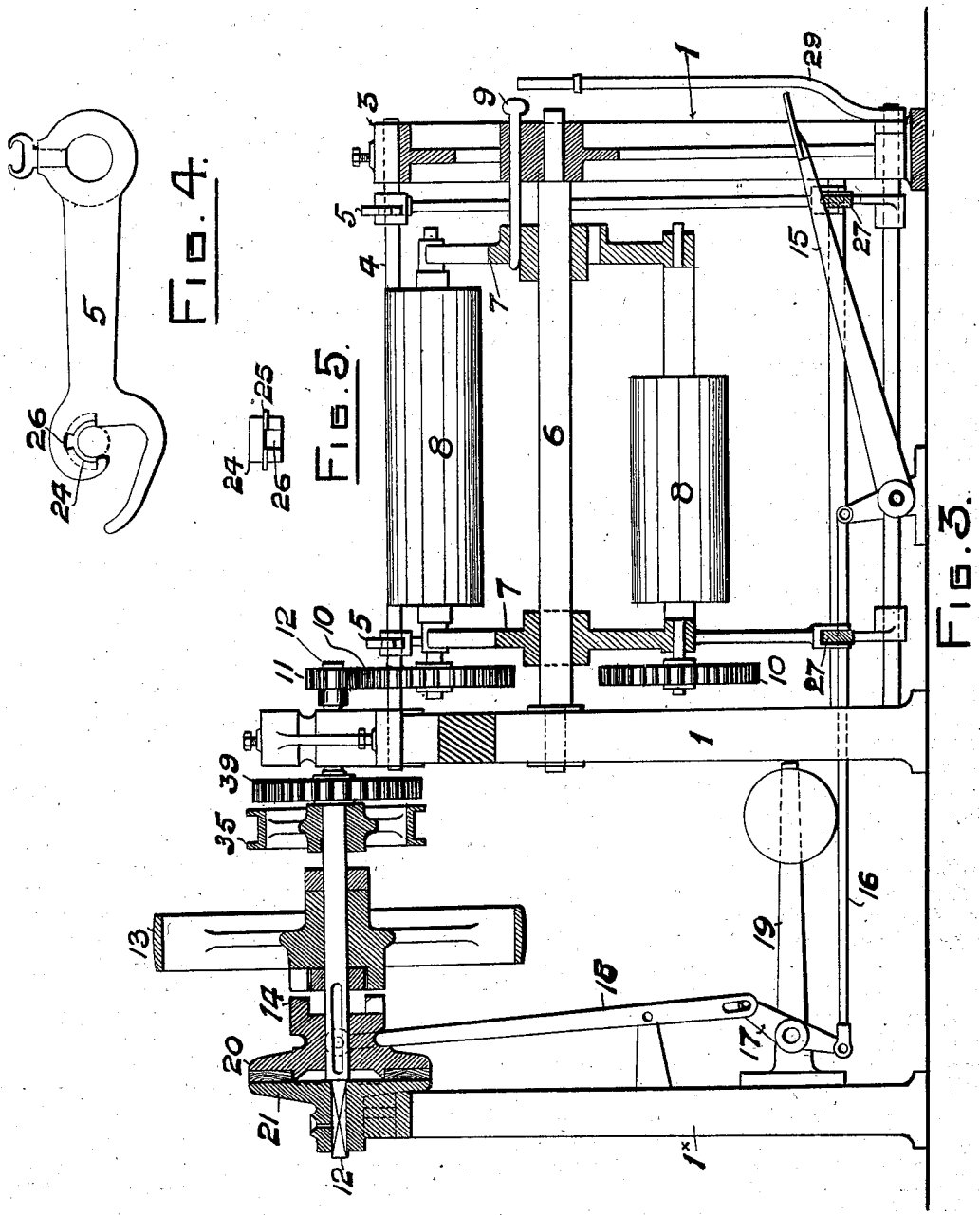

No. 727,664. Patented May 12, 1903.

UNITED STATES PATENT OFFICE.

ROBERT MILNE, OF EDINBURGH, SCOTLAND.

MACHINE FOR COVERING ROLLERS WITH INDIA-RUBBER OR LIKE MATERIALS.

SPECIFICATION forming part of Letters Patent No. 727,664, dated May 12, 1903.

Application filed January 27, 1902. Serial No. 91,512. (No model.)

*To all whom it may concern:*

Be it known that I, ROBERT MILNE, a subject of the King of Great Britain and Ireland, and a resident of Edinburgh, Scotland, have invented a new or Improved Machine for Use in Covering Rollers with India-Rubber or Like Materials, applicable also for other useful purposes, of which the following is a specification.

This invention refers to the covering of wringer and like rollers with india-rubber or other and like materials; and it consists, essentially, of a machine in which the spindle or roller to be covered is carried in hook-like bearings at the extremity of two lever-arms each by preference independent of the other and by their disposition and mounting, also by the force of a weight or weights, adapted to press the said roller upon the periphery of a revolving pressure-drum immediately below and as the roller is revolved and the india-rubber fed thereon build up and attach the required cover.

Figure 1:
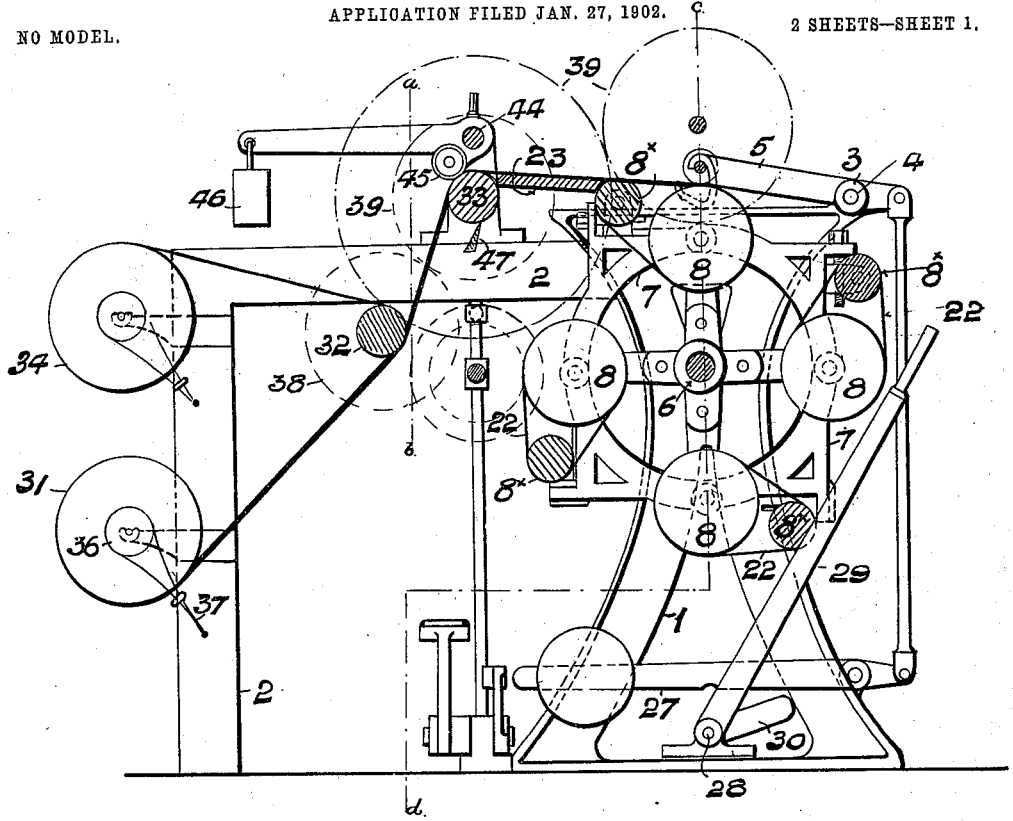
Figure 2:
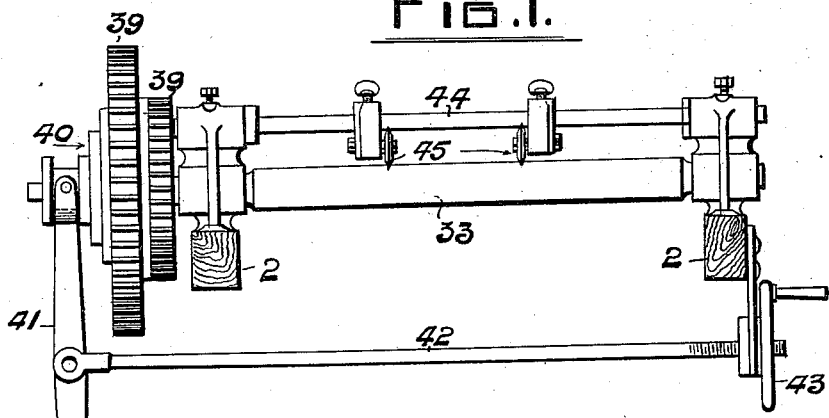

Upon the accompanying drawings, Figure 1 illustrates a side exterior elevation; Fig. 2, a transverse sectional elevation on line $a\ b$, and Fig. 3 a transverse sectional elevation on line $c\ d$, of a machine constructed in accordance with the invention. Figs. 4 and 5 illustrate detached details to a larger scale.

According to the invention I employ a machine-frame comprising sides 1 $1^\times$ and extensions 2. Upon the said sides of the machine I arrange brackets 3 and in such brackets I mount a shaft or rod 4, upon which in turn I mount a pair of lever-arms 5. In suitable bearings in the sides 1 I also mount a shaft 6 and upon such shaft two wheels 7, between and in the rims of which I axially mount a series of pressure-rollers 8 of even or varying lengths. When free to rotate, the said wheels serve to carry any one of the rollers 8 to the highest position and immediately between the hook-like extremities of the arms 5. (See Fig. 3.) When in such position, a cotter 9 passed through a hole in the machine side and a like hole in one of the wheels 7 serves to prevent further rotation thereof. Upon each of the shafts carrying the pressure-rollers 8 is a toothed wheel 10, which when in the top position gears with a pinion 11 on a driving-shaft 12, and thus with the shaft in motion rotates for the time being the uppermost pressure-roller.

The driving of the shaft 12 is effected by a belt-pulley 13 and a clutch 14, (see Fig. 3,) the pulley being loose on the shaft and having clutch-recesses in its boss and for starting (and stopping) the machine being engaged (and disengaged) by the sliding clutch part 14 under the impulse of a foot-lever 15, acting through a link 16, lever 17, and forked lever 18, a weighted lever 19 on the axis of lever 17 serving to return the clutch when the attendant's foot is removed from the foot-lever 15. Such return movement also serves to hold a lagged disk 20, forming part of the clutch 14, against a fixed friction-disk 21, and thus help in quickly stopping the machine. Around each pressure-roller 8 and around a small stentering-roller $8^\times$, carried in adjustable bearings on the wheels 7, passes an endless band 22, one part of which when the pressure-roller comes to the highest position forms a continuation of a table 23, as shown in Fig. 1.

The spindle of the roller to be covered is placed in and carried by the hook-like ends of the lever-arms 5, and when in position the roller rests upon the upper pressure-roller and the spindle thereof takes its bearing in the upper part of the hook-like ends, as shown in Fig. 4, a bearing-brass 24 (with segmental flange 25 and lateral dovetail projection 26 to hold it in position) being provided to compensate for wear and reduce friction. To the shorter arm of each lever 5 is connected a weighted lever 27, and such levers serve to press the roller to be covered upon the pressure-roller 8 with considerable force. To raise the said weighted levers, and thus raise the arms 5, say, when introducing the uncovered roller and removing a covered roller, I provide a rock-shaft 28 with long hand-lever 29 and short arms 30, which on being raised elevate the levers 27 or lower them, as required.

The rubber or material for covering the roller or spindle after being drawn from roll 31 passes around a carrier-roller 32, thence over a roller 33, over table 23, then onto the apron 22, and around the roller to be covered. The paper, usually intercoiled with the rubber for preventing the rubber sticking, after passing around the roller 32 passes onto the roll 34. After the first coil the machine is started, and with the rubber delivered from roll 31 at a rate in sympathy with the peripheral velocity of the pressure-roller, also with the weighted levers exerting their influence thereon, the rubber is tightly or closely wound around the roller until almost the full diameter (or, say, the last lap) is reached, when the rubber is severed by a knife or guillotine (not shown) upon the table 23, the small unwound portion when wound onto the roller completing the covering and making it ready for removal for subsequent treatment. Upon raising the weighted levers 27 the arms 5 are raised and the roller-spindle caused to rest in the lower parts of the hook-like extremities, from whence it may be readily removed and a new one be inserted.

For rollers having a gear-wheel attached I use one of the shorter pressure-rollers 8, the wheel taking into the space between the end of the said pressure-roller and wheel 7.

For winding the roll 31 I employ a pulley 35 and a friction-pulley on the reel-axle, and to create a slight drag I provide a small pulley 36 and tension-cord 37. The roller 32 is by preference driven through gear-wheels 38 39 and a friction-clutch 40, so that after severing the india-rubber on table 28 the motion of the rollers 32 and 33 and the letting-off parts may be arrested until the covering of the roller is completed, the clutch being operated by rock-lever 41, rod 42, and screwed hand-wheel 43.

To trim the longitudinal edges of the roller-covering material, I provide a hardened-steel roller in place of the roller 33 and a rod 44, carried in the same bearings above the roller 33, upon which are adjustable rotary cutters 45. These cutters being adjustable laterally and bearing under the pressure of weights 46 against the roller 33, over which the india-rubber passes, serve to trim the selvage edges of the rubber or cut it to the width required.

A squeegee or scraper 47 serves to keep the roller 33 clean.

What I claim is—

1. In a machine for use in covering rollers with india-rubber or like material a set of machine sides, a pair of wheels, weighted arms, rods and levers for supporting and raising the roller to be covered, bearings in said machine sides for the shaft or axis of the said wheels, a series of rollers of varying lengths between the said wheels, shafts for said rollers, and bearings in the said wheels therefor, a gear-wheel on each roller-axis, a driving-shaft and bearings therefor, a pinion thereon with which the several gear-wheels may in turn gear, a loose driving-pulley and a clutch-coupling on the said driving-shaft, also a friction-brake, and means for engaging and disengaging the said clutch and brake, substantially as set forth.

2. In a machine for use in covering rollers with india-rubber or like material, a set of machine sides, bearings therein, a shaft supported in such bearings, a pair of wheels on the shaft, means for holding the wheels stationary at different points, a series of rollers between the wheels, bearings therefor on the said wheels, a gear-wheel on each roller-axis, a series of stentering-rolls, bearings therefor on the wheels, an endless apron around each of the stentering-rolls, and one of the said rollers, and means for adjusting the tension of each apron, substantially as set forth.

3. In a machine for use in covering rollers with india-rubber or like material, a set of machine sides, bearings therein, a shaft supported in such bearings, a pair of wheels keyed on the shaft, a series of rollers between the wheels, bearings therefor in the said wheels, and said rollers mounted therein, a gear-wheel on each roller-axis, and the said wheel and the machine side having holes and a cotter-pin for locking the wheels stationary substantially as set forth.

4. In a machine for use in covering rollers with india-rubber or like material, carrier-arms with hook-like preparations at their free extremities and bearings, a rod on which such arms are mounted, weighted rods connected to said arms and means for raising and lowering the arms and weighted rods substantially as set forth.

5. In a machine for use in covering rollers with india-rubber or like materials, a table and frame, a hardened-steel roller arranged across the said frame, bearings therefor, and gearing operated by clutch mechanism, a scraper or squeegee acting on the said roller, a rod above the said roller and adjustable holders on such rod carrying rotary cutters and such cutters under the pressure of weighted lever-arms held against the said roller, substantially as set forth.

In witness whereof I have hereunto set my hand in the presence of two witnesses.

ROBERT MILNE. [L. S.]

Witnesses:
THOMAS CALLANDER,
FREDERICK PIATT.